(12) United States Patent
Lehmann et al.

(10) Patent No.: US 10,919,761 B2
(45) Date of Patent: Feb. 16, 2021

(54) PROCESS AND PLANT FOR PRODUCING A CONVERTED SYNTHESIS GAS

(71) Applicant: L'Air Liquide, Société Anonyme pour l'Etude et l'Exploitation des Procédés Georges Claude, Paris (FR)

(72) Inventors: Maik Lehmann, Frankfurt am Main (DE); Alexander Roesch, Butzbach (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 16/688,518

(22) Filed: Nov. 19, 2019

(65) Prior Publication Data
US 2020/0165127 A1 May 28, 2020

(30) Foreign Application Priority Data

Nov. 22, 2018 (EP) ..................................... 18020615

(51) Int. Cl.
*C01B 3/14* (2006.01)
*C01B 3/06* (2006.01)

(52) U.S. Cl.
CPC ................ *C01B 3/14* (2013.01); *C01B 3/068* (2013.01); *C01B 2203/0288* (2013.01); *C01B 2203/0805* (2013.01); *C01B 2203/0872* (2013.01)

(58) Field of Classification Search
CPC ... C01B 3/14; C01B 3/068; C01B 2203/0288; C01B 2203/0805; C01B 2203/0872; C01B 2203/04; C01B 2203/0495; C01B 2203/0883; C01B 2203/0894; C01B 3/50; Y02E 60/36
See application file for complete search history.

(56) References Cited

U.S. PATENT DOCUMENTS

| 3,367,882 | A  | 2/1968 | Marshall, Jr. |
| 4,476,683 | A  | 10/1984 | Shah et al. |
| 2009/0019767 | A1 | 1/2009 | Abughazaleh et al. |

FOREIGN PATENT DOCUMENTS

EP      0 044 071      1/1982

OTHER PUBLICATIONS

European Search Report and Written Opinion for corresponding EP 18020615, dated Feb. 18, 2019.

*Primary Examiner* — Jafar F Parsa
(74) *Attorney, Agent, or Firm* — Elwood L. Haynes

(57) ABSTRACT

The invention relates to a process for producing a converted synthesis gas from a crude synthesis gas comprising the essential synthesis gas constituents of hydrogen ($H_2$) and carbon monoxide (CO), wherein the crude synthesis gas is initially generated in a synthesis gas generation stage and subsequently converted in a multi-stage CO conversion and thus elevated in terms of its hydrogen content. The crude synthesis gas has steam added to it as a reaction partner for the CO conversion and cooling of the converted synthesis gas affords an aqueous condensate.

7 Claims, 3 Drawing Sheets

PROCESS AND PLANT FOR PRODUCING A CONVERTED SYNTHESIS GAS

CROSS REFERENCE TO RELATED APPLICATIONS

This application claims the benefit of priority under 35 U.S.C. § 119 (a) and (b) to European Patent Application No. EP 18020615.3, filed Nov. 22, 2018, the entire contents of which are incorporated herein by reference.

BACKGROUND

Field of the Invention

The invention relates to a process for producing a converted synthesis gas from a crude synthesis gas comprising the essential synthesis gas constituents of hydrogen ($H_2$) and carbon monoxide (CO), wherein the crude synthesis gas is initially generated in a synthesis gas generation stage and subsequently converted in a multi-stage CO conversion and thus elevated in terms of its hydrogen content. The crude synthesis gas has steam added to it as a reaction partner for the CO conversion and cooling of the converted synthesis gas affords an aqueous condensate.

The invention likewise relates to a plant for performing the process according to the invention.

Prior Art

On account of its great importance as an input material for numerous chemical syntheses, for example chemical industry feedstocks such as methanol or ammonia, the production of synthesis gas, i.e. gas mixtures comprising as their essential constituents hydrogen ($H_2$) and carbon monoxide (CO), has long been known and has been the subject of a great deal of discussion in the literature.

Reactants used for synthesis gas generation are generally carbon-containing input materials or input material mixtures which may be in solid, liquid or gaseous states of matter. Examples here include coal in lump form or powder form, biomass, crude oil factions, pyrolysis oils, biogas or natural gas. For conversion of non-gaseous input materials into synthesis gas, the operation is often described as gasification, whereas, when using natural gas, it is more usual to refer to reforming, for example—depending on the process mode—to steam reforming or autothermal reforming (ATR) or—in the absence of solid catalysts—to partial oxidation (PDX).

Initially obtained as the product of synthesis gas generation is a crude synthesis gas which in many cases is to be altered in respect of its $H_2$/CO ratio and is to be freed of certain unwanted by-products and trace constituents to make it suitable as an input for downstream process or synthesis stages.

Adjustment of the $H_2$/CO ratio is via the CO conversion reaction also known as the water-gas shift reaction (WGS) or CO shift reaction according to the reaction equation

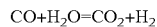
$$CO+H_2O=CO_2+H_2$$

Addition of steam as reaction steam causes the CO to react to afford $CO_2$ and $H_2$. Due to the reaction enthalpy of −41.2 kJ/mol, increasing temperature shifts the chemical equilibrium from the reaction products toward the reaction reactants. Depending on the employed reaction temperature, the reaction is referred to as a high temperature shift (HTS), medium temperature shift (MTS) or low temperature shift (LTS).

Depending on the type of catalysts employed, it is further also possible to perform the shift reaction with unpurified crude synthesis gas. This process is referred to as crude gas shift or else—on account of the acidic gas constituents, namely $CO_2$ and $H_2S$—as acid gas shift. Said process may also be performed with crude synthesis gases containing significant amounts of sulfur, soot or condensable hydrocarbons. A typical application is the CO conversion of crude gases from heavy oil gasification that have not been cooled and desulfurized but rather have only been suddenly cooled or quenched in the hot state to add the necessary steam and remove soot. A further typical application is the conversion of carbon monoxide into crude gases from high-pressure coal gasification which contain not only sulfur but also saturated and unsaturated hydrocarbons, including tars. For conversion of both crude gas types, catalysts based on cobalt/molybdenum have proven particularly advantageous. These are sulfur-resistant or achieve their full activity only in the presence of sulfidic sulfur. For instance the carbon monoxide content (about 45 vol %) of a crude gas from the partial oxidation of heavy oil that enters the CO shift reactor at about 250° C. and has a steam/dry gas ratio of about 0.8 can be reduced to about 1.6 vol % in a two-stage CO shift reactor system having a cobalt/molybdenum catalyst. The heat liberated by the reaction enthalpy is often used in one or more steam generators for high-pressure and low-pressure steam and for preheating feed water. The high-pressure steam thus generated may especially also be used as reaction steam for the CO conversion according to the reaction equation shown hereinabove.

After performance of the in some cases multi-stage CO conversion, the synthesis gas obtained as the conversion product is mostly cooled in order to supply it to a subsequent gas purification for example. This affords an aqueous condensate that also contains trace components/disruptive components such as dissolved gases, for example CO, $CO_2$, $H_2$, methane ($CH_4$) and ammonia ($NH_3$). However, the aqueous condensate may also contain methanol ($CH_3OH$) since it is formed as a trace component in the CO conversion reactors according to the equilibrium reaction:

$$CO+2H_2=CH_3OH$$

The position of the reaction equilibrium is dependent inter alia on temperature, methanol formation being thermodynamically favoured at low temperatures.

The disposal of this condensate is therefore costly and complex. European patent application EP 0 044 071 A1 therefore proposes evaporating the condensate by heat exchange with the at least partially converted gas and supplying it to the conversion together with the gas stream. In other words it proposes utilizing the evaporated condensate as reaction steam for the CO conversion.

However, due to its content of the abovementioned disruptive components, it is not possible to utilize the entire condensate stream as reaction steam; by contrast a small portion must be removed from the process to prevent further enrichment of the disruptive components. This discharge stream is referred to as a purge stream or bleed stream.

The evaporated proportion of the condensate is often insufficient in quantity to form the required total amount of reaction steam for the CO conversion. There therefore remains a further need for processes that propose an energetically optimized generation of reaction steam for CO conversion while optionally utilizing the obtained condensate as a steam source.

An alternative possibility for supplying the required reaction steam for the CO conversion provides for connecting upstream of the first CO conversion reactor a special saturator which, for example, is in the form of a column comprising internals through which the crude synthesis gas is passed and in which it is saturated with steam. The excess steam is withdrawn from the CO conversion product gas downstream of the last CO conversion reactor in a special desaturator, recycled to the saturator in condensed form and there re-utilized for saturating the entering crude synthesis gas ("Gasification", 2nd Edition, C. Higman, M. van der Burgt, Gulf Professional Publishing (2008), FIGS. 8-13, page 349). Though this can efficiently saturate the crude synthesis gas, the apparatus complexity is high since additional apparatuses, namely the saturator and the desaturator, must be provided.

SUMMARY

The invention accordingly has for its object to provide a process and a corresponding plant allowing energetically optimized generation of reaction steam for CO conversion with low apparatus complexity.

The object is achieved essentially by a process having the features of claim 1 et seq. and by a plant according to claim 8 et seq. Further especially preferred embodiments of the process and of the plant may be found in the respective subsidiary claims.

Process for producing a converted synthesis gas containing hydrogen ($H_2$) and carbon monoxide (CO), comprising the following process steps:

(a) providing a first synthesis gas stream having a first $H_2$/CO ratio and providing a reaction steam stream, (b) combining and mixing the first synthesis gas stream with the reaction steam stream, (c) introducing the first synthesis gas stream comprising the admixed reaction steam stream into a first CO conversion stage and converting under CO conversion conditions, discharging a second synthesis gas stream having a second $H_2$/CO ratio, (d) providing a first steam generator suitable for generation of a first steam stream by evaporation of boiler feed water and/or an aqueous process condensate, (e) introducing the second synthesis gas stream as a heating stream into the first steam generator, discharging a cooled second synthesis gas stream and a first steam stream from the first steam generator, (f) introducing the cooled second synthesis gas stream into a second CO conversion stage and converting under CO conversion conditions, discharging a third synthesis gas stream having a third $H_2$/CO ratio, (g) introducing the third synthesis gas stream into at least one cooling apparatus, cooling the third synthesis gas stream in the at least one cooling apparatus to below its dew point, discharging a cooled third synthesis gas stream and the aqueous process condensate,
characterized in that (h) the reaction steam stream comprises the first steam stream, (i) the generation of the first steam stream in the first steam generator is effected by evaporation of boiler feed water and/or at least a portion of the aqueous process condensate.

Plant for producing a converted synthesis gas containing hydrogen ($H_2$) and carbon monoxide (CO), comprising the following constituents in fluid connection with one another:

(a) means for providing a first synthesis gas stream having a first $H_2$/CO ratio and for providing a reaction steam stream, (b) means for combining and mixing the first synthesis gas stream with the reaction steam stream, (c) a first CO conversion stage, means for introducing the first synthesis gas stream comprising the admixed reaction steam stream into the first CO conversion stage, means for discharging a second synthesis gas stream having a second $H_2$/CO ratio, (d) a first steam generator suitable for generation of a first steam stream by evaporation of boiler feed water and/or an aqueous process condensate, (e) means for introducing the second synthesis gas stream as a heating stream into the first steam generator, means for discharging a cooled second synthesis gas stream and a first steam stream from the first steam generator, (f) a second CO conversion stage, means for introducing the cooled second synthesis gas stream into the second CO conversion stage, means for discharging a third synthesis gas stream having a third $H_2$/CO ratio, (g) at least one cooling apparatus suitable for cooling the third synthesis gas stream to below its dew point, means for introducing the third synthesis gas stream into the at least one cooling apparatus, means for discharging a cooled third synthesis gas stream and the aqueous process condensate,
characterized in that (h) it further comprises means which allow the reaction steam stream to comprise the first steam stream, (i) it further comprises means which allow the generation of the first steam stream in the first steam generator to be affected by evaporation of boiler feed water and/or at least a portion of the aqueous process condensate.

The list of features numbered with letters or numbers specified in the claims does not necessarily reflect the temporal sequence of the process steps or the spatial arrangement of plant constituents.

Fluid connection between two regions is to be understood as meaning any type of connection whatsoever which makes it possible that a fluid, for example the liquid absorption medium, can flow from the one to the other of the two regions, neglecting any interposed regions, component parts, valves or apparatuses.

A CO conversion stage is to be understood as meaning a spatially delimited region configured such that the CO conversion reaction may be performed in its interior. To this end the CO conversion stage comprises means for introduction of a synthesis gas stream to be converted and of water as the reaction partner, means for discharging a converted, i.e. enriched in hydrogen and depleted in CO, synthesis gas stream and a catalyst active for the CO conversion reaction. The CO conversion stage may comprise for example a CO conversion reactor, especially also a plurality of CO conversion reactors, which each contain a single catalyst bed or else especially a plurality of catalyst beds. The CO conversion reactors and/or the catalyst beds may be traversed consecutively and/or simultaneously by the synthesis gas stream to be converted.

CO conversion conditions are to be understood as meaning physicochemical conditions which allow an at least partial, preferably industrially relevant, for example largely complete, conversion of the carbon monoxide present in the crude synthesis gas into carbon dioxide and hydrogen. Said conditions are known per se from the prior art and comprise for example the use of suitable catalysts and the establishment of suitable temperatures. The precise CO conversion conditions will be chosen suitably by a person skilled in the art according to the carbonaceous materials to be converted/the desired degree of conversion. In particular, said person will also consider the influence of the physicochemical conditions on the position of the reaction equilibrium in conjunction with the reaction kinetics.

A means is to be understood as meaning a thing which makes it possible to achieve or is helpful to the achievement of a goal. In particular, means for performing a certain process step are to be understood as meaning all physical articles which a person skilled in the art would contemplate in order to be able to perform this process step. For example, as a means for introducing or discharging a material stream, a person skilled in the art will contemplate all transporting and conveying apparatuses, for example pipelines, pumps, compressors, valves, which on account of his knowledge of the art appear necessary or useful to him for performing this process step.

The predominant proportion of a material or material stream is to be understood as meaning a quantity fraction of more than 50%. Unless otherwise stated in individual cases, the quantity fraction relates to the mass/the mass flow.

Pressures reported in the unit bar(a) relate to absolute pressure in bar absolute. Pressures reported in the unit bar(g) relate to positive pressure in bar.

The invention is based on the realization that utilizing the obtained condensate as a steam source allows for energetically optimized generation of reaction steam for the CO conversion.

The invention is further based on the realization that the trace substances or disruptive components present in the condensate separated from the product gas of the CO conversion can be efficiently decomposed, i.e. significantly reduced in terms of their concentration, by contacting with the CO conversion catalyst.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF THE PREFERRED EMBODIMENTS

Figure 1:
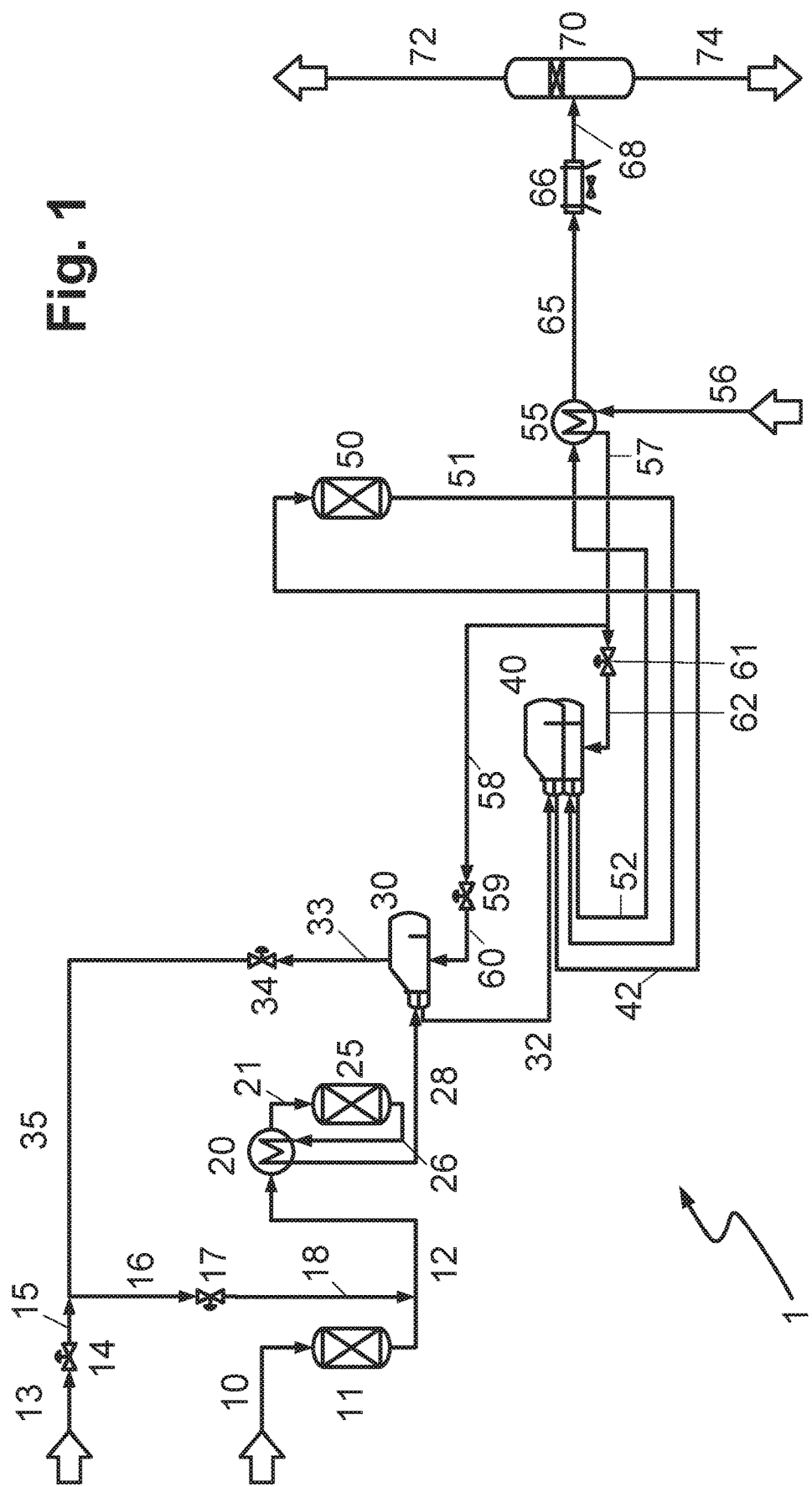
FIG. 1 is a schematic representation of a first exemplary embodiment a the process/of a plant according to the invention.

A particular embodiment of the process according to the invention is characterized in that the reaction steam stream is composed of the first steam stream and a fresh steam stream and generation of the first steam stream is affected in the first steam generator by evaporation of boiler feed water. Such a generation of the reaction steam stream from a plurality of components provides increased flexibility, for example upon startup of the process.

An alternative embodiment of the process according to the invention is characterized in that the reaction steam stream is composed of the first steam stream and a fresh steam stream and generation of the first steam stream is affected in the first steam generator by evaporation of at least a portion of the aqueous process condensate. In this way the condensate obtained is utilized and treatment/disposal cost and complexity is reduced. This also makes it possible to reduce the consumption of boiler feed water.

Preference is given to a particular embodiment of the process according to the invention which provides that the reaction steam stream is composed of the first steam stream and the generation of the first steam stream in the first steam generator is effected by evaporation of the predominant proportion of the aqueous process condensate, wherein the remaining proportion of the aqueous process condensate is discharged from the process as a purge stream. This avoids enrichment of unwanted disruptive components within the steam generation circuit.

In a further particular embodiment of the process according to the invention, it is provided that the first steam generator comprises two heat exchangers, wherein the generation of the first steam stream in the first steam generator is effected in indirect heat exchange against the second synthesis gas stream as the heating stream in the first heat exchanger and against a hot fresh steam stream as the heating stream in the second heat exchanger. The utilization of two different heating streams in the first steam generator to generate the first steam stream increases process mode flexibility, for example during startup of the process. Furthermore, utilization of the hot fresh steam stream as the heating stream in the second heat exchanger allows complete condensate evaporation even in the case of high condensate generation since the flow of the fresh steam can be chosen to be correspondingly large while by contrast the flow of the second synthesis gas stream as the heating stream in the first heat exchanger is determined by the flow of the crude synthesis gas. After its utilization as a heating stream, the now-cooled fresh steam stream may still be employed as a feedstock/in terms of its heat content in adjacent process stages or plant parts, for example in the generation of the crude synthesis gas, for example by steam reforming.

In a particular embodiment of the process according to the invention, the reaction steam stream is composed of the first steam stream and the generation of the first steam stream in the first steam generator is effected by evaporation of the predominant proportion of the aqueous process condensate and a proportion of boiler feed water, wherein the remaining proportion of the aqueous process condensate is discharged from the process as a purge stream. In this way boiler feed water and fresh steam are saved and the obtained process condensate is used as a feedstock, wherein recycling of the process condensate advantageously results in disruptive components present therein being at least partially catalytically decomposed over the CO conversion catalyst.

It is preferable when the reaction steam stream is composed of the first steam stream and the generation of the first steam stream in the first steam generator is effected by evaporation of the predominant proportion of the aqueous process condensate and a proportion of boiler feed water, wherein the remaining proportion of the aqueous process condensate is discharged from the process as a purge stream and wherein the proportion of boiler feed water is equal in quantity to the purge stream. This provides a simple option for controlling, and especially keeping constant, the steam generation circuit.

A particular embodiment of the plant according to the invention is characterized in that it further comprises means which allow the reaction steam stream to be composed of the first steam stream and a fresh steam stream and the generation of the first steam stream to be affected in the first steam generator by evaporation of boiler feed water. Such a generation of the reaction steam stream from a plurality of components provides increased flexibility, for example upon startup of the plant.

An alternative embodiment of the plant according to the invention is characterized in that it comprises means which allow the reaction steam stream to be composed of the first steam stream and a fresh steam stream and the generation of the first steam stream to be effected in the first steam generator by evaporation of at least a portion of the aqueous process condensate. In this way the condensate obtained is utilized and treatment/disposal cost and complexity is reduced. This also makes it possible to reduce the consumption of boiler feed water.

Preference is given to a particular embodiment of the plant according to the invention which provides that means are comprised which allow the reaction steam stream to be composed of the first steam stream and the generation of the first steam stream in the first steam generator to be effected by evaporation of the predominant proportion of the aqueous process condensate, wherein the remaining proportion of the aqueous process condensate is discharged from the process as a purge stream. This avoids enrichment of unwanted disruptive components within the steam generation circuit.

In a further particular embodiment of the plant according to the invention, it is provided that the first steam generator comprises two heat exchangers, wherein the generation of the first steam stream is effected in the first steam generator in indirect heat exchange against the second synthesis gas stream as the heating stream in the first heat exchanger and against a hot fresh steam stream as the heating stream in the second heat exchanger. The utilization of two different heating streams in the first steam generator to generate the first steam stream increases process mode flexibility, for example during startup of the plant. Furthermore, utilization of the hot fresh steam stream as the heating stream in the second heat exchanger allows complete condensate evaporation even in the case of high condensate generation since the flow of the fresh steam can be made correspondingly large while by contrast the flow of the second synthesis gas stream as the heating stream in the first heat exchanger is determined by the flow of the crude synthesis gas. After its utilization as a heating stream, the now-cooled fresh steam stream may still be employed as a feedstock/in terms of its heat content in adjacent process stages or plant parts, for example in the generation of the crude synthesis gas, for example by steam reforming.

In a particular embodiment of the plant according to the invention, means are comprised which allow the reaction steam stream to be composed of the first steam stream and the generation of the first steam stream in the first steam generator to be effected by evaporation of the predominant proportion of the aqueous process condensate and a proportion of boiler feed water, wherein the remaining proportion of the aqueous process condensate is discharged from the process as a purge stream. In this way boiler feed water and fresh steam are saved and the obtained process condensate is used as a feedstock, wherein recycling of the process condensate advantageously results in disruptive components present therein being at least partially catalytically decomposed over the CO conversion catalyst.

It is preferable when means are also comprised which allow the reaction steam stream to be composed of the first steam stream and the generation of the first steam stream in the first steam generator to be effected by evaporation of the predominant proportion of the aqueous process condensate and a proportion of boiler feed water, wherein means are also comprised which allow the remaining proportion of the aqueous process condensate to be discharged from the process as a purge stream and wherein the proportion of boiler feed water is equal in quantity to the purge stream. This provides a simple option for controlling, and especially keeping constant, the steam generation circuit.

Further features, advantages and possible applications of the invention are also apparent from the following description of a working and numerical example and from the drawings. All the features described and/or depicted; on their own or in any combination, form the subject-matter of the invention, irrespective of their combination in the claims or their dependency references.

The controlling, gating and conveying devices, for example valves, gate valves or pumps, shown in the figures, are shown merely by way of example to help elucidate the process sequence. A person skilled in the art will know to accordingly provide any further devices of the abovementioned types if required or advantageous.

In the embodiment shown schematically in FIG. 1 of a process/a plant 1 according to a first exemplary embodiment of the invention, crude synthesis gas is supplied from a plant for synthesis gas generation (not shown) via conduit 10. Since in the present working example synthesis gas generation is carried out by coal gasification, the generated crude synthesis gas still contains sulfur components such as for example hydrogen sulfide ($H_2S$). The crude synthesis gas is therefore subjected to a desulfurization in desulfurization reactor 11. This may be affected for example by adsorptive or absorptive binding of the sulfur to suitable sorbents, for example zinc oxide (ZnO). A dedusting filter (not shown) is often arranged upstream of the desulfurization reactor.

Depending on the type of catalysts used for the CO conversion, it is also possible to use other process embodiments in which the desulfurization reactor is arranged downstream of the CO conversion stages, arranged between a plurality of CO conversion stages or eschewed entirely. In the literature this process mode is also referred to as crude gas shift or acid gas shift while the embodiment described hereinabove is also referred to as a sweet gas shift.

The desulfurized and optionally deducted crude synthesis gas leaves the desulfurization reactor as the first synthesis gas stream having a first $H_2/CO$ ratio via conduit 12 and is combined with a steam stream as reaction steam stream which is supplied via conduit 18. The combined gas streams are heated in heat exchanger 20 in indirect heat exchange against hot reactor product gas from the reactor 25 and via conduit 21 enter into reactor 25 which forms the first CO conversion stage. Effected here under CO conversion conditions is a first partial reaction of the CO present in the first synthesis gas stream with the added steam to obtain a second synthesis gas stream having a second, elevated $H_2/CO$ ratio which is discharged from the reactor 25 via conduit 26. Due to the exothermicity of the CO conversion reaction, the temperature of the gas stream leaving the reactor 25 is higher than that of the gas stream entering the reactor and therefore a portion of the liberated heat energy is transferred via a heat exchanger 20 to the gas stream supplied via conduit 12.

Via conduit 28 the second synthesis gas stream is discharged from the heat exchanger 20 and introduced into a heat exchanger integrated into a first steam generator 30 as a heating stream. In the first steam generator 30 a further portion of the heat energy from the second synthesis gas stream is utilized for steam generation, in particular for generation of the reaction steam required for CO conversion. The boiler feed water required therefor is passed to the first steam generator 30 via the conduits 56, 57, 58, 60 and control valve 59. Via conduits 33, 35, 16, 18 and control valves 34, 17 the generated steam is discharged from the first steam generator and supplied to the first synthesis gas stream in conduit 12. In addition, superheated high-pressure steam is supplied via conduits 13, 15 and control valve 14 and combined with the steam stream in conduit 35.

Via conduit 32 the further cooled second synthesis gas stream is discharged from the heat exchanger of the first steam generator and supplied to a first heat exchanger integrated into a second steam generator 40. In the second steam generator 40 a further portion of the heat energy of the second synthesis gas stream is utilized for steam generation, wherein the steam thus generated is discharged from the second steam generator via a conduit (not shown) and may be supplied to external consumers for example. The boiler feed water required therefor is passed to the second steam generator 40 via the conduits 56, 57, 62 and control valve 61.

Via conduit 42 the further cooled second synthesis gas stream is discharged from the first heat exchanger of the second steam generator and supplied to a reactor 50 which forms a second CO conversion stage. Effected here is a further partial reaction of the CO present in the second synthesis gas stream under CO conversion conditions with steam still present to obtain a third synthesis gas stream having a third, further elevated $H_2/CO$ ratio which is discharged from the reactor 50 via conduit 51. Due to the exothermicity of the CO conversion reaction, the temperature of the gas stream leaving the reactor 50 is higher than that of the gas stream entering the reactor and therefore the third synthesis gas stream is supplied to a second heat exchanger likewise integrated into the second steam generator 40. Thus, in the second steam generator 40 a portion of the heat energy from the third synthesis gas stream is likewise utilized for steam generation.

Via conduit 52 the cooled third synthesis gas stream is discharged from the second heat exchanger of the second steam generator and introduced into a heat exchanger 55. Effected therein is the further cooling of the third synthesis gas stream in indirect heat exchange against cold boiler feed water which is supplied via conduit 56 to the heat exchanger 55 and, now heated, discharged therefrom via conduit 57. The further cooled third synthesis gas stream is then supplied via conduit 65 to an air cooler 66. Effected therein is a further cooling of the third synthesis gas stream to below its dew point in indirect heat exchange against ambient air. The further cooled third synthesis gas stream, now cooled to below its dew point, is subsequently discharged from the air cooler via conduit 68 and supplied to a phase separator 70. Effected therein is separation of the third synthesis gas stream into a gaseous, converted synthesis gas product which is discharged from the process/from the plant via conduit 72 and supplied to a conditioning or further processing that is not discussed further here.

A liquid, water-containing condensate is discharged from the phase separator via conduit 74. It contains typical trace components such as CO, $CO_2$, $H_2$, $CH_4$, $NH_3$ and methanol and must therefore be sent for special workup or disposal.

Figure 2:
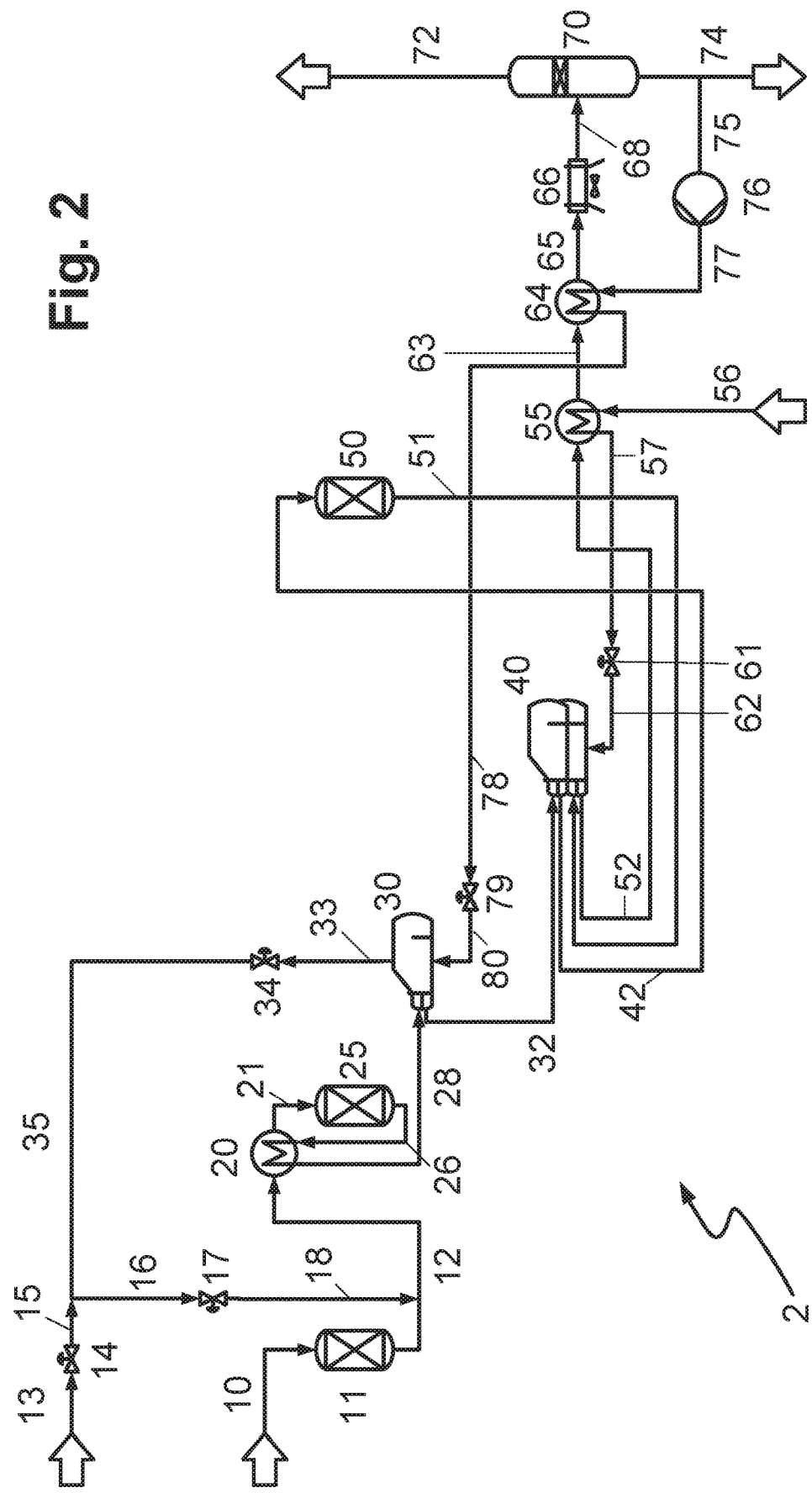
FIG. 2 is a schematic representation of a second exemplary embodiment of a process/of a plant according to the invention.

In the embodiment shown schematically in FIG. 2 of a process/a plant 2 according to a second exemplary embodiment of the invention, the plant parts having reference numerals 10 to 74 correspond to what is recited above in the discussion of FIG. 1 in terms of their structure, functions and properties unless otherwise stated. Now newly included are the conduits 75, 77, 78, 80 and also pump 76 and control valve 79 through which at least a portion and optionally the entirety of the condensate obtained in the phase separator save for a small purge stream is passed to the first steam generator 30 where it is used for generation of a portion of the reaction steam required for the CO conversion. Before entry into the first steam generator the recycled condensate is heated in indirect heat exchange against the third synthesis gas stream in the additional heat exchanger 64 which is connected to the heat exchanger 55 via the newly included conduit 63. It is advantageous in this embodiment of the invention that the trace components present in the condensate are partially decomposed and thus reduced in terms of their concentration upon renewed contacting with the CO conversion catalysts present in the reactors 25 and 50. The amount of condensate discharged from the process/the plant and thus the cost and complexity for disposal or external workup of the condensate is further reduced. A significant amount of boiler feed water is also saved.

Figure 3:
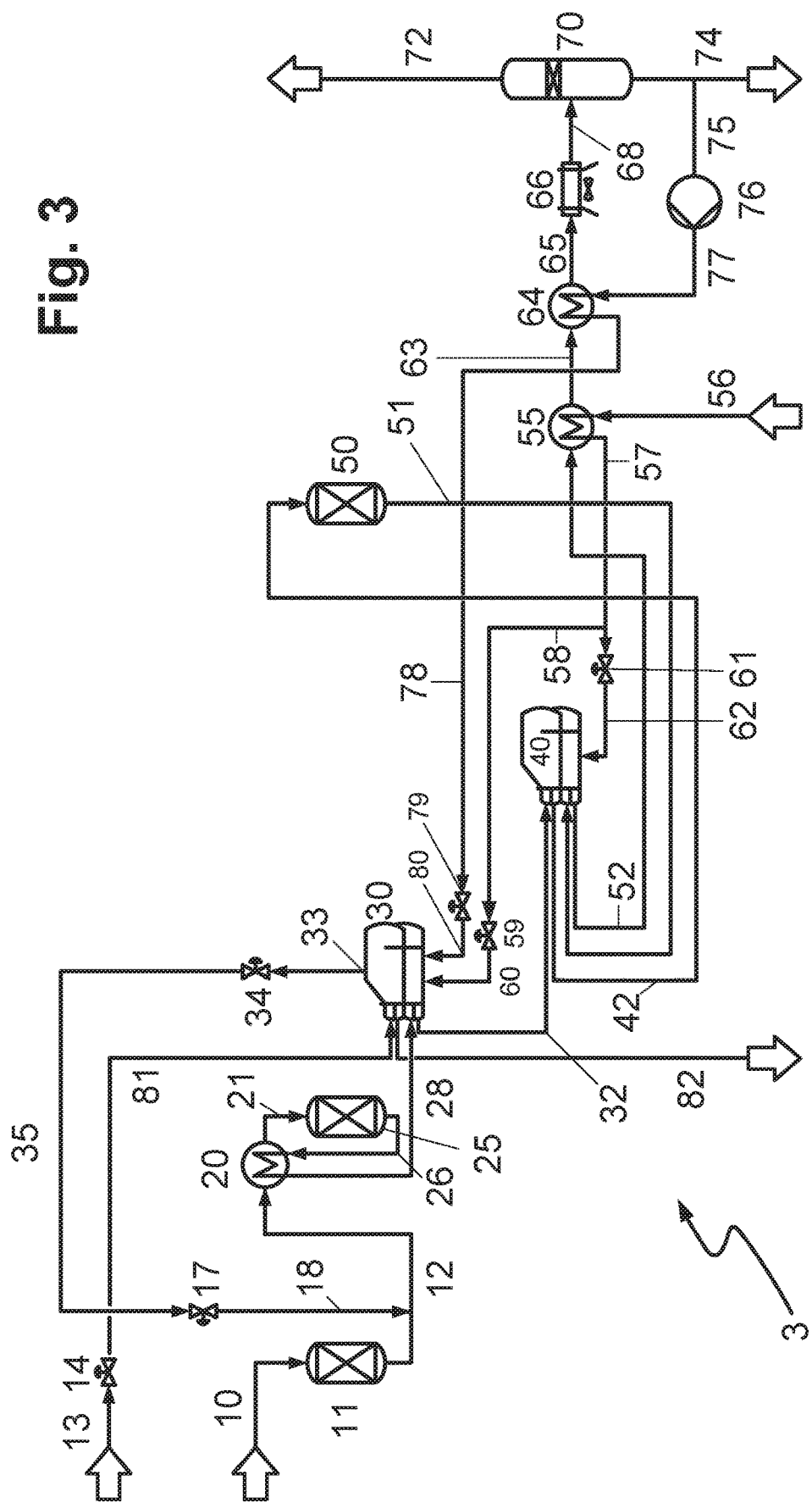
FIG. 3 is a schematic representation of a third exemplary embodiment of a process/of a plant according to the invention.

In the embodiment shown schematically in FIG. 3 of a process/a plant 3 according to a third exemplary embodiment of the invention, the first steam generator is provided both with boiler feed water and with recycled condensate in contrast to the previously discussed embodiments of the invention according to FIGS. 1 and 2. The reaction steam required for the CO conversion is exclusively generated in the first steam generator and combined with the first synthesis gas stream in conduit 12. In order to provide the greater amount of energy required for the evaporation of the now greater amount of liquid in the first steam generator, the first steam generator is provided with a second integrated heat exchanger into which superheated high-pressure steam is introduced via conduits 13, 81 and control valve 14. Once heat exchange has taken place the cooled steam is discharged from the second integrated heat exchanger via conduit 82. In contrast to the embodiments of the invention discussed with reference to FIGS. 1 and 2 the supplied high-pressure steam is not used as a feedstock but utilized only in terms of its enthalpy content. It may subsequently be supplied to external consumers as heating steam or process steam, thus providing additional economic advantages.

The table which follows summarizes and compares typical operating parameters of the embodiments of the invention discussed hereinabove in order to verify numerically the advantages mentioned hereinabove in the discussion of the individual embodiments.

TABLE

Typical operating parameters of the embodiments of the invention, FIGS. 1 to 3

| Mass flows t/h | FIG. 1 | FIG. 2 | FIG. 3 |
| --- | --- | --- | --- |
| Steam to conduit (13) | 5 | 5 | 5 |
| Steam from conduit (82) | 0 | 0 | 5 |
| Steam consumption as feedstock | 5 | 5 | 0 |
| Condensate from conduit (74) | 10 | 5 | <1 |
| Condensate recycling conduit (75) | 0 | 5 | >9 |
| Steam from (30) conduit (35) | 5 | 5 | 10 |

The invention provides a process for producing a converted synthesis gas/a corresponding plant allowing resource-efficient, energetically optimized generation of reaction steam for CO conversion with low apparatus complexity. Recycling of the obtained condensate for production of reaction steam reduces the consumption of boiler feed water and of high-pressure steam. The discharged amount of condensate and the cost and complexity for disposal or external workup of the condensate are reduced. Furthermore, the trace components present in the condensate are partially decomposed and thus reduced in terms of their concentration upon renewed contacting with the CO conversion catalysts.

LIST OF REFERENCE NUMERALS 1,2,3 Plant
10 Conduit
11 Desulfurization reactor
12 Conduit
13 Conduit
14 Control valve
15 Conduit
16 Conduit
17 Control valve
18 Conduit
20 Heat exchanger
21 Conduit
25 Reactor (first CO conversion stage)
26 Conduit
28 Conduit
30 First steam generator
32 Conduit
33 Conduit
34 Control valve
35 Conduit
40 Second steam generator
42 Conduit
50 Reactor (second CO conversion stage)
51 Conduit
52 Conduit
55 Heat exchanger
56 Conduit
57 Conduit
58 Conduit
59 Control valve
60 Conduit
61 Control valve
62 Conduit
63 Conduit
64 Heat exchanger
65 Conduit
66 Air cooler
68 Conduit
70 Phase separator
72 Conduit
74 Conduit
75 Conduit
76 Pump
77 Conduit
78 Conduit
79 Control valve
80 Conduit
81 Conduit
82 Conduit

What is claimed is:

1. A process for producing a converted synthesis gas containing hydrogen ($H_2$) and carbon monoxide (CO), comprising the following process steps:
   a) providing a first synthesis gas stream having a first $H_2$/CO ratio and providing a reaction steam stream,
   b) combining and mixing the first synthesis gas stream with the reaction steam stream,
   c) introducing the first synthesis gas stream comprising the admixed reaction steam stream into a first CO conversion stage and converting under CO conversion conditions, discharging a second synthesis gas stream having a second $H_2$/CO ratio,
   d) providing a first steam generator suitable for generation of a first steam stream by evaporation of boiler feed water and/or an aqueous process condensate,
   e) introducing the second synthesis gas stream as a heating stream into the first steam generator, discharging a cooled second synthesis gas stream and a first steam stream from the first steam generator,
   f) introducing the cooled second synthesis gas stream into a second CO conversion stage and converting under CO conversion conditions, discharging a third synthesis gas stream having a third $H_2$/CO ratio,
   g) introducing the third synthesis gas stream into at least one cooling apparatus, cooling the third synthesis gas stream in the at least one cooling apparatus to below its dew point, discharging a cooled third synthesis gas stream and the aqueous process condensate,
   wherein
   h) the reaction steam stream comprises the first steam stream,
   i) the generation of the first steam stream in the first steam generator is affected by evaporation of boiler feed water and/or at least a portion of the aqueous process condensate.

2. The process of claim 1, wherein the reaction steam stream is composed of the first steam stream and a fresh steam stream and the generation of the first steam stream is effected in the first steam generator by evaporation of boiler feed water.

3. The process of claim 1, wherein the reaction steam stream is composed of the first steam stream and a fresh steam stream and the generation of the first steam stream is effected in the first steam generator by evaporation of at least a portion of the aqueous process condensate.

4. The process of claim 1, wherein the reaction steam stream is composed of the first steam stream and the generation of the first steam stream in the first steam generator is effected by evaporation of the predominant proportion of the aqueous process condensate, wherein the remaining proportion of the aqueous process condensate is discharged from the process as a purge stream.

5. The process of claim 4, wherein the first steam generator comprises two heat exchangers, wherein the generation of the first steam stream in the first steam generator is effected in indirect heat exchange against the second synthesis gas stream as the heating stream in the first heat exchanger and against a hot fresh steam stream as the heating stream in the second heat exchanger.

6. The process of claim 1, wherein the reaction steam stream is composed of the first steam stream and the generation of the first steam stream in the first steam generator is effected by evaporation of the predominant proportion of the aqueous process condensate and a proportion of boiler feed water, wherein the remaining proportion of the aqueous process condensate is discharged from the process as a purge stream.

7. The process of claim 6, wherein the reaction steam stream is composed of the first steam stream and the generation of the first steam stream in the first steam generator is effected by evaporation of the predominant proportion of the aqueous process condensate and a proportion of boiler feed water, wherein the remaining proportion of the aqueous process condensate is discharged from the process as a purge stream and wherein the proportion of boiler feed water is equal in quantity to the purge stream.

* * * * *